No. 757,476. PATENTED APR. 19, 1904.
C. P. MALCOLM.
VEHICLE RUNNING GEAR.
APPLICATION FILED APR. 18, 1903.
NO MODEL.
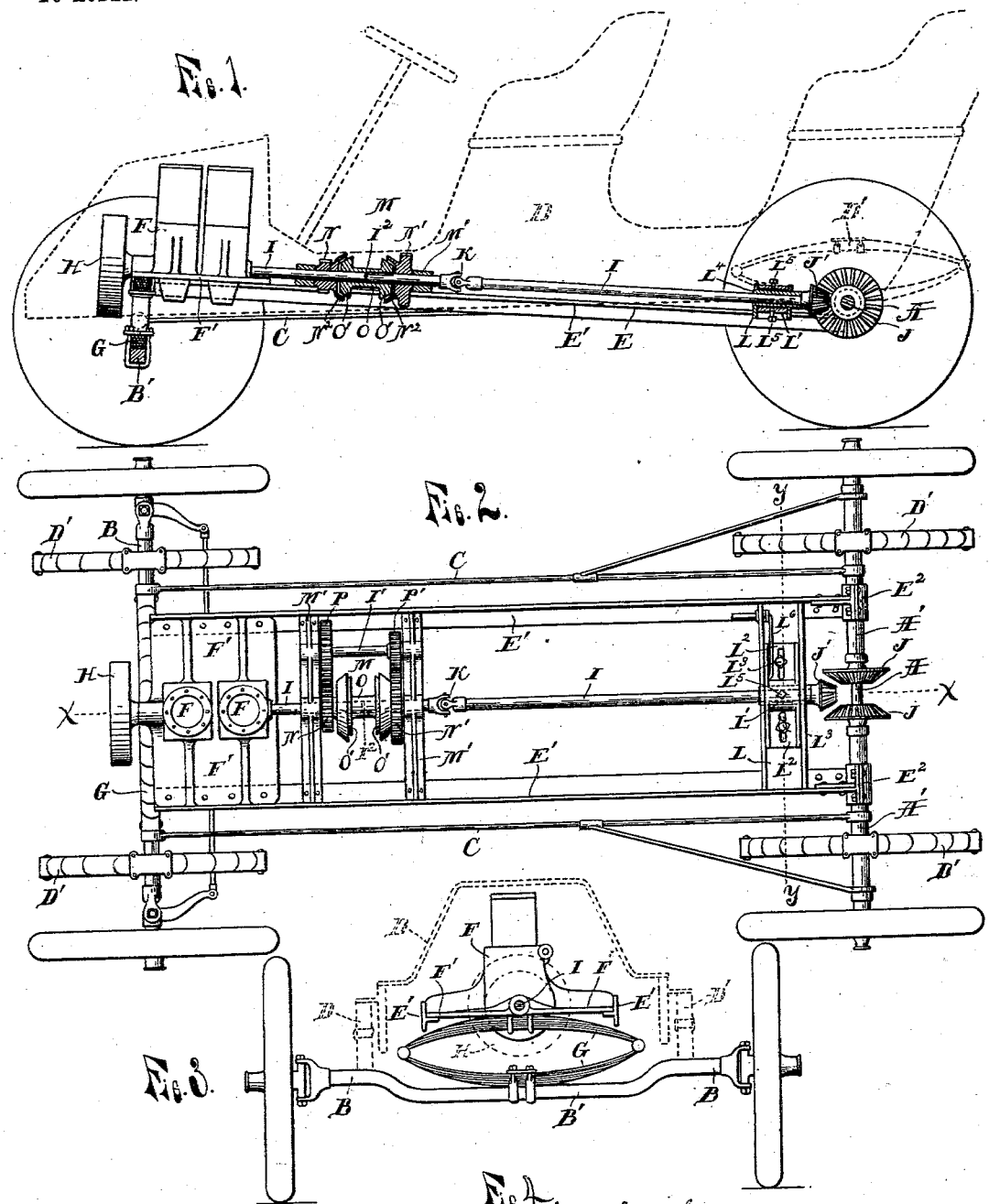
INVENTOR.
C. P. Malcolm,
by Edmund J. Scully
Attorney.
WITNESSES.

No. 757,476. PATENTED APR. 19, 1904.
C. P. MALCOLM.
VEHICLE RUNNING GEAR.
APPLICATION FILED APR. 18, 1903.
NO MODEL.
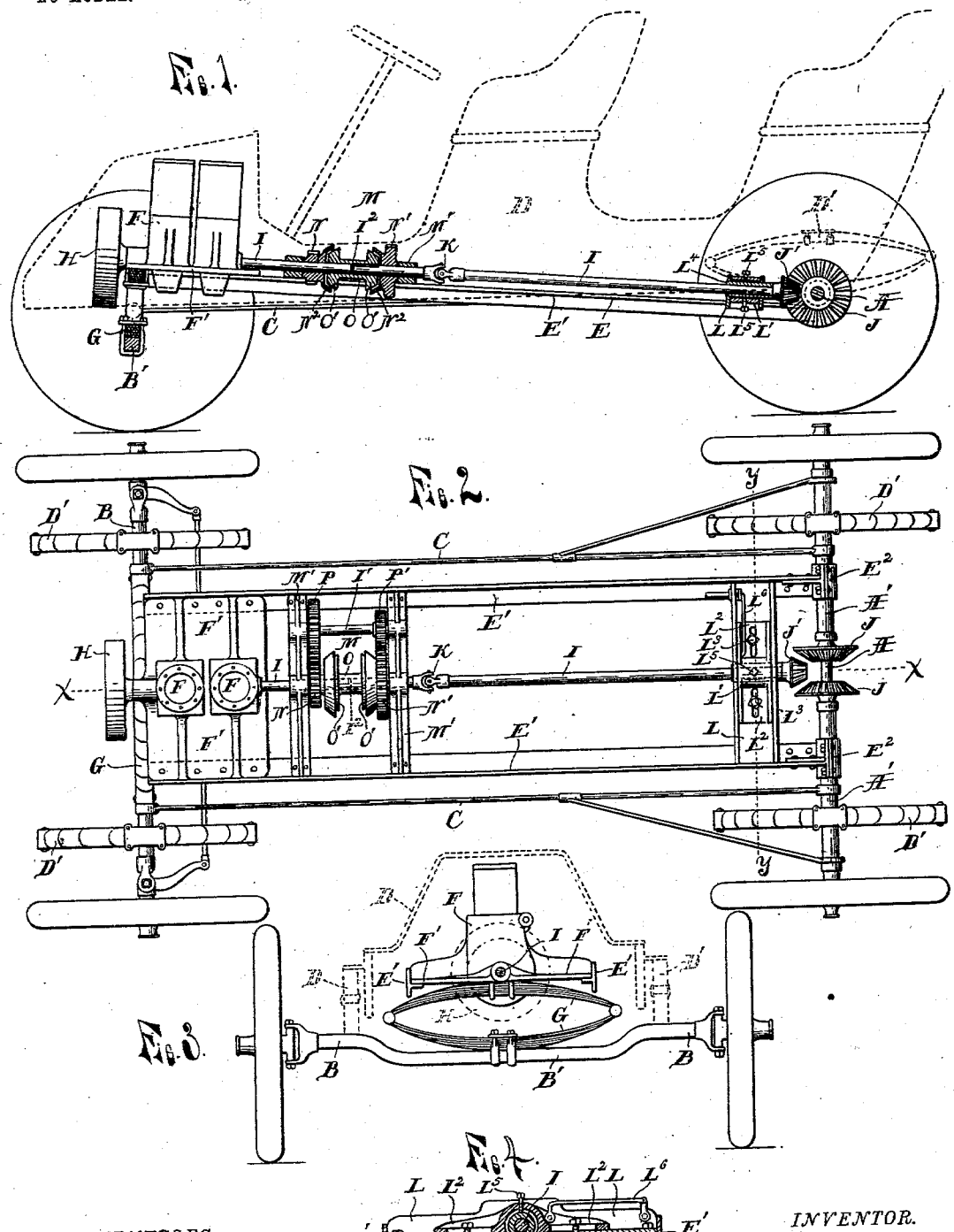
WITNESSES.
INVENTOR.
C. P. Malcolm,
by Edmund J. Scully
Attorney.

No. 757,476. Patented April 19, 1904.

UNITED STATES PATENT OFFICE.

CHARLES P. MALCOLM, OF OWOSSO, MICHIGAN.

VEHICLE RUNNING-GEAR.

SPECIFICATION forming part of Letters Patent No. 757,476, dated April 19, 1904.

Application filed April 18, 1903. Serial No. 153,232. (No model.)

*To all whom it may concern:*

Be it known that I, CHARLES P. MALCOLM, a citizen of the United States, residing at Owosso, in the county of Shiawassee and State of Michigan, have invented certain new and useful Improvements in Motor-Vehicle Running-Gear, of which the following is a specification.

This invention relates to improvements in the running-gear of motor-vehicles of the type of the automobile which are driven by gas, vapor, or steam engines. Its object is to support the engine so that the jar or vibration thereof will not be transmitted to the body to any appreciable extent, thus making an easy-riding vehicle, and also to so support the engine that its main driving-shaft may be geared directly to the driving-axle without the intervention of driving-chains or other flexible means of power transmission to compensate for the flexure of the spring-support of the engine.

It is also an object of this invention to provide an efficient running-gear composed of few parts which may be easily manufactured.

To this end the invention consists in supporting both the vehicle-body and engine upon springs, each entirely independent of the other, and in providing an engine-supporting frame pivoted at one end to turn upon the driving-axle and supported at its opposite end upon a spring secured to the other axle, the engine-frame being extended longitudinally of the frame and geared to the rear axle to transmit power directly thereto.

The invention also consists in the construction of the engine-supporting frame and in the particular arrangement and construction of the parts, all as hereinafter more fully described, and particularly pointed out in the claims, reference being had to the accompanying drawings, in which—

Figure 1 is a longitudinal section on the line $x\,x$ of Fig. 2 of a construction embodying the invention with the vehicle-body shown in dotted lines. Fig. 2 is a plan view of the same. Fig. 3 is a front elevation, and Fig. 4 is an enlarged section on the line $y\,y$ of Fig. 2.

A is the rear or driving axle, pivoted with the ordinary bearing-sleeve A', through which the axle extends.

B is the front axle, to which the front or steering wheels are pivotally attached in the ordinary manner; C, the reach portions connecting the axles, and D the body, (shown in dotted lines,) supported upon the axles by the four springs D'.

E is the engine-supporting frame, consisting of the two T-bars E', which are provided with bearings $E^2$ at their rear ends to embrace the sleeve A' of the driving-axle and turn thereon and which extend forward parallel with each other to a point above the front axle, where they are connected by outwardly-extending flanges F' on the engine-casing F. Secured by suitable clips to the middle of the downwardly-bent portion B' of the axle B is a spring G, which extends longitudinally of the axle and is secured at its upper side to the flange F' or engine-casing to support the forward end of the frame E.

H is the balance-wheel of the engine, located at the forward side of the engine and in front of the spring G, where it is accessible in starting the engine, and the engine-shaft I extends rearwardly in the longitudinal center line of the frame E to a point adjacent to the driving-axle, which is provided with two opposing bevel-gears adapted to be engaged by a suitable bevel-pinion J' on the end of the said shaft. These gears J are spaced at a distance apart greater than the diameter of the pinion J', and by providing a suitable flexible joint K in the shaft and suitable means for moving the end thereof to engage the gear J' with one or the other of the gears J the vehicle may be propelled ahead or backward at the will of the operator, or the engine may be run without driving the machine by throwing the gear J' into the mid-position, as shown in Fig. 2.

To support the rear or flexible end of the shaft I, a bearing-casting L is secured at its ends to the T-bars E' near the rear axle, and upon this casting is a bearing-ring L', having laterally-projecting slotted arms $L^2$, through which slots and through the castings L extend the bolts L³ to secure the ring to the casting and at the same time allow said ring to be moved laterally of the frame E. A bearing-block L⁴ for the shaft I is pivotally supported within the ring L' and prevented from moving longitudinally therein by the bearing-screws L⁵, carried by the ring and engaging the upper and lower sides of the block, so that when the ring is moved laterally by means of the operating-rod L⁶ to shift the gear J' the angle of the bearing-block may change with the shaft and allow for the movement of the ring.

M is a change-speed gearing supported by the transverse frames M', secured at their ends to the bars E' and provided with bearings for the shaft I and also for a counter-shaft I'. The shaft I is divided at I², and connecting the divided ends is a sleeve O, splined to the rear part of the shaft to move longitudinally thereon and turn therewith, which sleeve is provided at each end with a friction-cone O' to engage cups N², one of said cups being integral with the small gear N, securedly keyed on the engine end of the shaft, and the other cup being integral with the large gear N', which is loosely sleeved on the opposing end of the shaft, and secured on the counter-shaft is a large gear P, in mesh with the gear N, and also a small gear P', in mesh with the gear N'. Means (not shown) are provided for moving the sleeve O, so that when a high speed is desired the operator will move the sleeve to bring the friction-clutch on the gear N into operation, thus uniting the divided ends of the shaft, and power will be transmitted direct from the engine through the sleeve and spline to the rear part of the shaft. When slow speed is desired, the sleeve is moved to bring the cone into contact with the cup on the gear N', and motion will be transmitted from the engine part of the shaft through the gears N and P to the counter-shaft and from the counter-shaft through the gears P' and N', the clutch on the gear N', the sleeve and spline to the rear part of the shaft, and thus by reason of the size and proportion of the gears the speed will be reduced.

It is evident that any other suitable change-speed gearing may be used and that the joint K, means for supporting and moving the shaft, and reverse-gearing may be omitted.

Having thus fully described my invention, what I claim is—

1. In a motor-vehicle running-gear, the combination of the driving-axle, and the vehicle-body and engine supported on springs each entirely independent of the other, an engine-supporting frame pivoted at one end on the driving-axle and at its other end spring-supported from the other axle, the engine having a shaft extended rearward, and a balance-wheel on said shaft forward of the front spring, a pivotal support for the rear end of said shaft and a universal joint in said shaft between said pivotal support and the balance-wheel.

2. In a motor-vehicle running-gear, the combination of a driving-axle, a vehicle-body and an engine supported on springs each entirely independent of the other, an engine-supporting frame pivoted at one end on the driving-axle and at the other spring-supported from the other axle, the engine-shaft extended rearward, a balance-wheel on the said shaft forward of the front spring, a laterally-movable bearing for the rear end of the shaft, and pivoted means in said bearing adapted to be moved to change the angle thereof.

3. In a motor-vehicle running-gear the combination, with the driving-axle, of an engine-supporting frame pivotally secured at one end to said axle and spring-supported at its opposite end, an engine on said frame having a divided driving-shaft extending longitudinally of the frame in a line described radially from the driving-axle, a balance-wheel on said shaft forward of the front spring, a gear on said shaft, a gear on the axle in mesh with said gear, a counter-shaft extending parallel with the driving-shaft, frames provided with bearings for the divided ends of the driving-shaft and the counter-shaft and secured to the frame, a sleeve connecting the divided ends of the drive-shaft and splined to the driving ends, friction-cones on said sleeve, a small gear sleeved on the shaft at one side of the sleeve and provided with a friction-cup, a large gear secured to the shaft at the other side of the sleeve and also provided with a cup, a large gear secured to the counter-shaft in mesh with the small gear, and a small gear on the counter-shaft in mesh with the large gear.

4. In a motor-vehicle running-gear, the combination of an engine supported at the forward end entirely independently of the vehicle-body, a rearwardly-extending engine-shaft, a balance-wheel on the forward end thereof in advance of the support of the engine, a flexible joint in said shaft, a laterally-movable bearing-ring for the rear end of said shaft, a bearing-block pivotally mounted in said ring, and means for changing the angle of said bearing-block.

5. In a motor-vehicle running-gear, the combination of an engine supported at the forward end entirely independently of the vehicle-body, a rearwardly-extending engine-shaft, a balance-wheel on the forward end thereof in advance of the support of the engine, a flexible joint in said shaft, a laterally-movable bearing-ring for the rear end of said shaft, a bearing-block pivotally mounted in said ring, means for changing the angle of said bearing-block, and means preventing longitudinal movement of said block within said ring.

6. In a motor-vehicle running-gear, the combination of an engine supported at the forward end entirely independent of the vehicle-body, a rearwardly-extended engine-shaft, a balance-wheel thereon, a laterally-movable bearing-ring for the rear end of said shaft, means pivoted in said ring, and means for changing the angle of said means.

In testimony whereof I have signed my name to this specification in presence of two witnesses.

CHARLES P. MALCOLM.

Witnesses:
J. A. SMITH,
W. REVELL.